(12) United States Patent
Tóth et al.

(10) Patent No.: US 10,800,452 B2
(45) Date of Patent: Oct. 13, 2020

(54) RIPPLE MINIMIZATION BY PROPER AS/TS MAGNET ARRANGEMENT IN ELECTRIC POWER ASSISTED STEERING APPARATUS

(71) Applicants: thyssenkrupp AG, Essen (DE); THYSSENKRUPP PRESTA AG, Eschen (LI)

(72) Inventors: Tivadar Kristóf Tóth, Paty (HU); Gergely Mihály Pavlisinec, Budapest (HU)

(73) Assignees: THYSSENKRUPP AG, Essen (DE); THYSSENKRUPP PRESTA AG, Eschen (LI)

( * ) Notice: Subject to any disclaimer, the term of this patent is extended or adjusted under 35 U.S.C. 154(b) by 230 days.

(21) Appl. No.: 16/080,246

(22) PCT Filed: Mar. 4, 2016

(86) PCT No.: PCT/EP2016/054668
§ 371 (c)(1),
(2) Date: Aug. 27, 2018

(87) PCT Pub. No.: WO2017/148534
PCT Pub. Date: Sep. 8, 2017

(65) Prior Publication Data
US 2019/0047619 A1    Feb. 14, 2019

(51) Int. Cl.
*B62D 6/10* (2006.01)
*G01L 5/22* (2006.01)
(Continued)

(52) U.S. Cl.
CPC ............. *B62D 6/10* (2013.01); *B62D 5/0463* (2013.01); *B62D 15/0215* (2013.01);
(Continued)

(58) Field of Classification Search
CPC .... B62D 6/10; B62D 5/0463; B62D 15/0215; G01D 5/24476; G01L 3/104; G01L 5/221
See application file for complete search history.

(56) References Cited

U.S. PATENT DOCUMENTS 9,869,539 B2 *   1/2018   Klimenko ................ G01B 7/30
10,081,386 B2 *   9/2018   Toyama .................... B62D 6/10
(Continued)

FOREIGN PATENT DOCUMENTS

CN    104039630 A    9/2014
CN    104870958 A    8/2015
(Continued)

OTHER PUBLICATIONS

The International Search Report issued in PCT/EP2016/054668, dated Dec. 13, 2016 (dated Dec. 20, 2016).

*Primary Examiner* — Ruth Ilan
*Assistant Examiner* — Marlon A Arce
(74) *Attorney, Agent, or Firm* — thyssenkrupp North America, LLC

(57) ABSTRACT

A power steering apparatus assists steering of a vehicle by conferring torque generated by an electric motor to a steering mechanism. The apparatus includes a steering column with linked upper and lower steering shafts. An angle sensor (AS) includes a gear and magnet to measure the steering shaft angle. A torque sensor (TS) measures the relative shift angle between the upper and lower steering shaft and includes a multi-pole ring magnet and a magnetic flux conductor. The TS and AS are arranged such that the AS magnet influences the TS measurement creating a steering shaft angle depending error signal. The steering mechanism is arranged such that a zero crossing of an envelope curve of the error signal is given for the neutral position of the
(Continued)

steering apparatus or a range of the steering position in which the steering angle is less than a threshold angle limit.

10 Claims, 3 Drawing Sheets

(51) Int. Cl.
    *G01L 3/10*     (2006.01)
    *B62D 15/02*     (2006.01)
    *G01D 5/244*     (2006.01)
    *B62D 5/04*     (2006.01)

(52) U.S. Cl.
    CPC .......... *G01D 5/24476* (2013.01); *G01L 3/104* (2013.01); *G01L 5/221* (2013.01)

(56) References Cited

U.S. PATENT DOCUMENTS 10,081,388 B2 * 9/2018 Choi ..................... B62D 6/10
2011/0068780 A1 * 3/2011 Sakai ..................... G01D 5/145
                                                                                                        324/207.25
2012/0152034 A1     6/2012 Kaess
2013/0019693 A1     1/2013 Klimenko
2014/0332308 A1    11/2014 Kirschbaum
2016/0054187 A1     2/2016 Schoepe
2016/0138983 A1 * 5/2016 Ikeda ..................... B62D 6/10
                                                                                                           73/862.193
2016/0214648 A1     7/2016 Schoepe
2017/0101128 A1     4/2017 Kirschbaum
2017/0144693 A1 * 5/2017 Okubo ................... B62D 5/046
2020/0180689 A1 * 6/2020 Asaka ..................... G08C 15/12

FOREIGN PATENT DOCUMENTS

| | | |
|---|---|---|
| CN | 105339770 A | 2/2016 |
| DE | 102010033769 A | 2/2012 |
| EP | 1536217 B | 6/2005 |
| EP | 2868551 A | 5/2015 |
| WO | 2013/091795 A | 6/2013 |

* cited by examiner

RIPPLE MINIMIZATION BY PROPER AS/TS MAGNET ARRANGEMENT IN ELECTRIC POWER ASSISTED STEERING APPARATUS

CROSS REFERENCE TO RELATED APPLICATION

This application is a U.S. National Stage Entry of International Patent Application Serial Number PCT/EP2016/054668, filed Mar. 4, 2016, the entire contents of which are incorporated herein by reference.

FIELD

The present disclosure generally relates to an electric power steering apparatus for assisting steering of a motor vehicle and a method for reducing torque ripple in an electric power assisted steering system of a motor vehicle.

BACKGROUND

Angle sensors (also referred to as AS) have the ability to collectively measure, steering wheel angle and speed with a number of steering wheel turns. In addition for differential torque measurement, a torque sensor (also referred to as TS) is used, which comprises a ring magnet which is fixed to the upper shaft and flux conductor parts which are fixed to the lower shaft. The torque sensor measures the relative shift angle between two rotating shafts of the steering column linked by a torsion bar. This angular data is converted into a voltage output and is fed to the electronic control unit of the electric power assisted steering apparatus to determine how much power assistance is required.

Common AS consist of one or more gear wheels. A multi-pole ring magnet of the torque sensor (TS) is mounted on the steering column. The ring magnet of the TS is surrounded circumferentially by a first gear wheel having an outwardly directed first toothing, which represents the steering angle. One or two smaller gear wheels rotate on the toothing of the first gear. In the case of using two gears the smaller gears have gear ratios higher than one and they differ by one or more teeth, so that one gear wheel turns faster than the other. In each of the two small gears a two-pole permanent magnet is arranged, providing magnetic signal for angle sensors placed very close to the multi-pole ring magnet of a torque sensor unit (TSU). With this Nonius principle it is possible to determine an unambiguous steering angle over a defined range of turns of the steering wheel. AS measures the magnetic field, wherein the torque sensor detects the strength of the magnetic field deriving from the multi-pole ring magnet. The multi-pole ring magnet and the two-pole magnets of the two smaller gears cause disturbances on each other. This disturbance results in faulty calculation of steering assist, which causes undesired torque ripple.

Thus, a need exists for an electric power steering apparatus that reduces torque ripple by optimization of the influences between AS and TS magnets.

DETAILED DESCRIPTION

Figure 1:
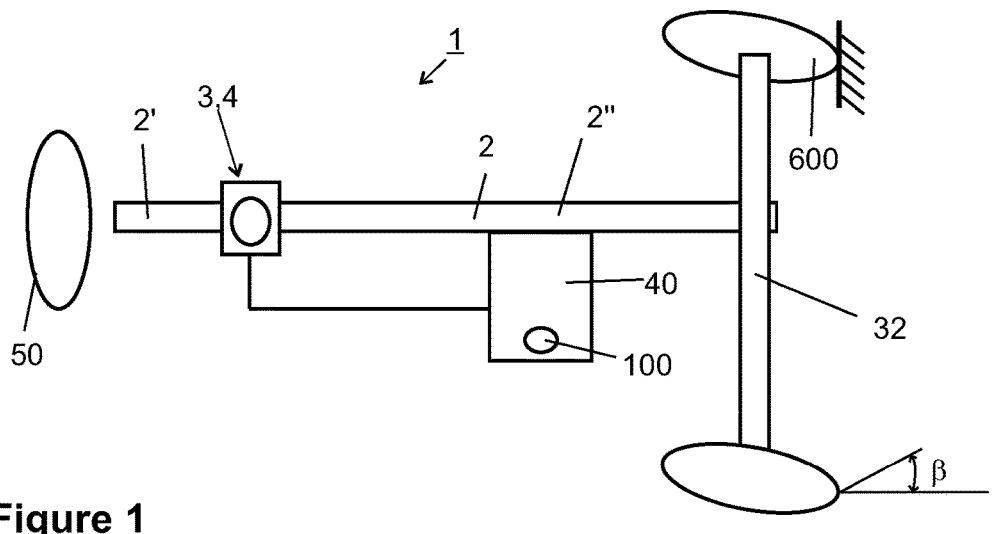
FIG. 1 is a schematic view of an electric power steering apparatus.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present invention relates to an electric power steering apparatus for assisting steering of a motor vehicle according to the preamble of claim 1 and a method for reducing torque ripple in an electric power assisted steering system of a motor vehicle having the features of the preamble of claim 5. The invention further relates to a method of calibration of a measuring device for the measurement of the absolute steering angle of an electric power assisted steering system.

Accordingly the steering mechanism is arranged in the apparatus in such a way, that a zero crossing of an envelope curve of the steering shaft angle depending error signal is given for the neutral position of the steering apparatus or a range of the steering position in which the steering angle is less than a threshold angle limit. The neutral position of the steering wheel describes a region which provides the straight ahead driving of the vehicle.

Preferably the TS and AS are arranged in an integral unit.

In one preferred embodiment the AS has two gears, which are preferably two accelerating gears, with magnets arranged inside, which rotate on an outwardly directed toothing of a first gear coupled torque-proof to the lower steering shaft, so that the rate and number of lower steering shaft turns can be measured.

In another preferred embodiment the AS comprises one accelerating gear and one satellite gear.

Preferably the AS works based on a nonius principle.

Accordingly a method for reducing torque ripple in an electric power steering apparatus of a motor vehicle is provided, the apparatus comprising: a motor to support the steering operation, a steering column with an upper steering shaft and a lower steering shaft linked by a torsion bar and an angle sensor (AS), which comprises at least one gear with a magnet to measure the steering shaft angle and a torque sensor (TS), which can measure the relative shift angle between the upper steering shaft and the lower steering shaft, and wherein the TS comprises a multi-pole ring magnet and a magnetic flux conductor, and wherein the TS and AS are arranged in such a way, that the at least one AS magnet influences the TS measurement creating a steering shaft angle depending error signal of the TS, said method comprises the steps of:
a) Preassembling the AS with pre-arrangement of the at least one magnet;
b) Arrangement of the AS and the TS in the steering column;
c) End of line calibration of the TS;
d) Rotation of the steering column from one endpoint to the other;
e) Simultaneous to step d), measurement of TS signal and steering shaft angle with an external position sensor and storage of data;
f) Determination of TS error signal as a function of steering shaft angle;
g) Fitting of an envelope curve to TS error signal;
h) Determination of steering shaft angle at zero crossing point of envelope curve;
i) According to step h), turning back of steering column to given steering shaft angle to determine the neutral position of steering apparatus or a range of the steering position in which the steering angle is less than a threshold angle limit in relation to the zero crossing point of envelope curve.

In combination with other preferably embodiments or solely it is preferable that the steering apparatus is adjusted by final assembling of the mechanical components like the said at least one smaller gear and/or the steering shaft in such a way, that the zero crossing point is such narrow as possible to the neutral position.

It is further in combination with other preferably embodiments or solely preferable that the steering apparatus is fixed after turning back to the zero crossing point and assembled into the motor vehicle in which steered road wheels are in a straight run position.

It is further in combination with other preferably embodiments or solely preferable that the determined steering shaft angle and/or the torque value (T) is calibrated software-based by the influence of the envelope curve to the measured torque (T) and/or angle.

In one preferred embodiment the AS has two gears with magnets arranged inside, which rotate on an outwardly directed toothing of a first gear coupled torque-proof to the steering shaft, wherein the magnets provide a magnetic signal for a steering angle detection.

Preferably the steering angle of the AS is determined based on a nonius principle.

Figure 3:
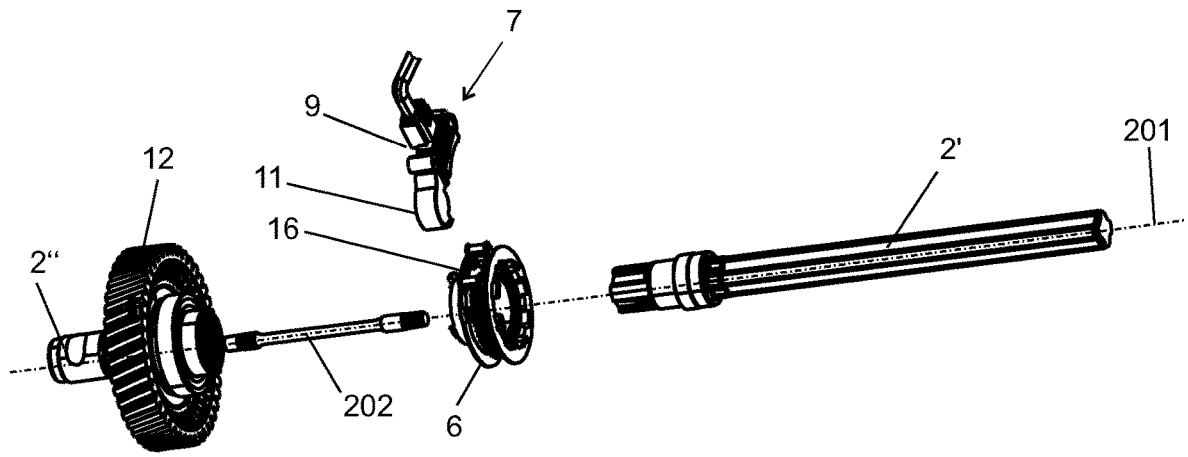
FIG. 3 is an exploded view of an integral unit of AS and TS.

FIG. 1 is a schematic diagram of an electric power steering apparatus 1. A steering wheel 50 is fixed to a upper steering shaft 2', the steering movement of the driver is transmitted via a torsion bar to a lower steering shaft 2". The lower steering shaft 2" is coupled to a rack 32 via a rack-and-pinion mechanism. Rotation of the higher and lower steering shafts 2', 2" accompanying a steering operation is converted into a reciprocating linear motion of the toothed rack 32 by the rack-and-pinion mechanism. The linear motion of the rack 32 changes the steering angle of the steered road wheels 600. To provide steering assistance, in a preferred embodiment the electric motor 100 can be mounted to the side of the steering shaft 2. The steering assistance is provided by transferring the assist torque from the motor 100 via a worm gear 40 into the lower steering shaft 2". The FIGS. 2, 3, 4 are corresponding to this embodiment of the invention.

Figure 7:
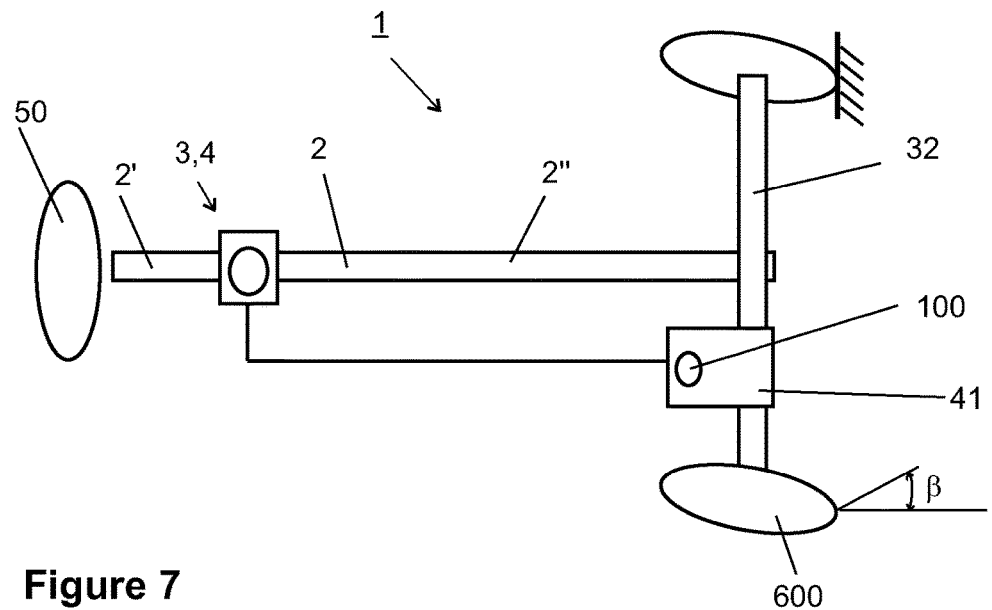
FIG. 7 is a schematic view of an alternative embodiment of an electric power steering apparatus.

Another alternative embodiment is shown in FIG. 7. According this embodiment the electric motor 100 is mounted to the side of the rack housing and drives the rack shifting by a gear unit 41. The invention is applicable also for other methods to transferring the motor torque into the steering mechanism.

Figure 2:
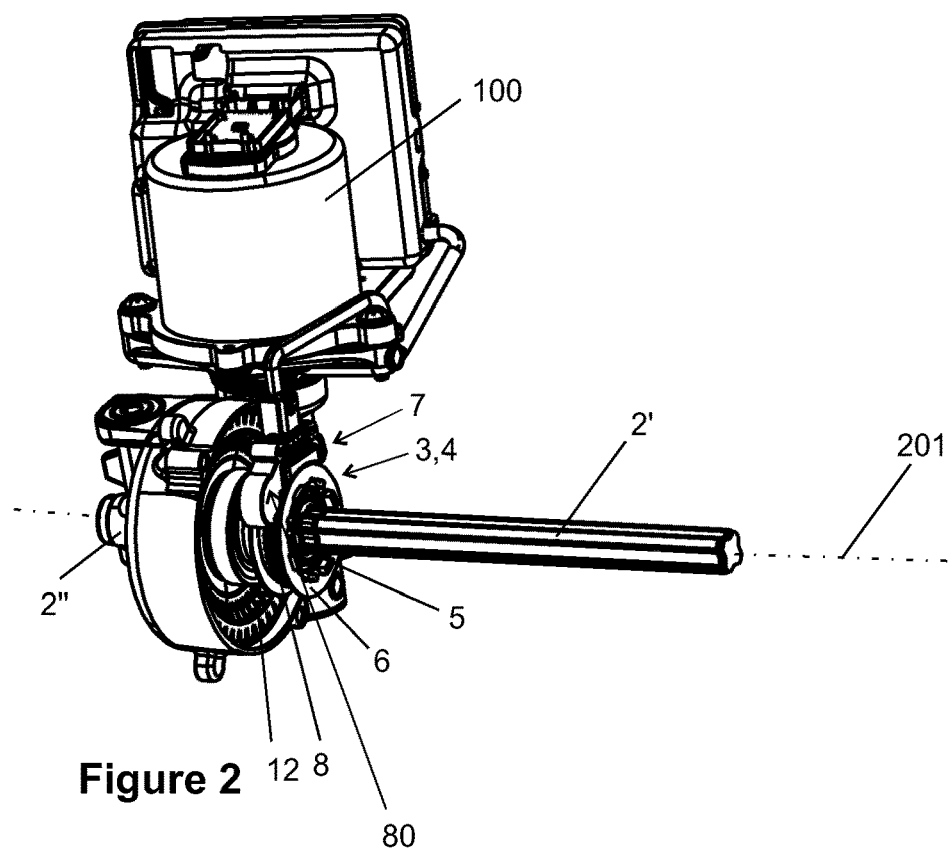
FIG. 2 is a spatial view of an electric motor with AS and TS.

FIG. 2 shows an electric motor 100 of an electric power assisted steering system. The steering shaft 2 comprises an upper steering shaft 2' and a lower steering shaft 2", which are connected via a torsion bar 202, as shown in FIG. 3. The movement of the steering shaft 2 is pivoted around the steering shaft axis 201. The upper steering shaft 2' is connected to a steering wheel 50 (see FIG. 1). The electric motor 100 drives via a worm gear 12 the lower steering shaft 2", which is connected to a rack and pinion steering gear, (see FIG. 1). An integral unit 7 with a torque sensor (TS) 3 and a steering angle sensor (AS) 4 is provided. The TS 3 detects the rotation of the upper steering shaft 2' with respect to the lower steering shaft 2" as a measure of a manually applied torque to the upper steering shaft 2'. The angle sensor 4 measures the current steering angle ($\alpha$). The invention is applicable in case of measurement the current steering angle of the upper steering shaft 2' and also in case of measurement of the current steering angle of the lower steering shaft 2". In the example the lower steering shaft angle is measured by the AS. The TS 3 comprises a multi-pole ring magnet 5 with permanent magnets coupled torque-proof to the upper steering shaft 2' and a magnetic flux conductor 6 coupled torque-proof to the lower steering shaft 2". The movement of the upper steering shaft 2' against the lower steering shaft 2" is detected via a magnetic sensor 60. The magnetic sensor measures the steering torque T. A corresponding sensor unit 80 is connected stationary to the unit of the electric motor 100.

Figure 4:
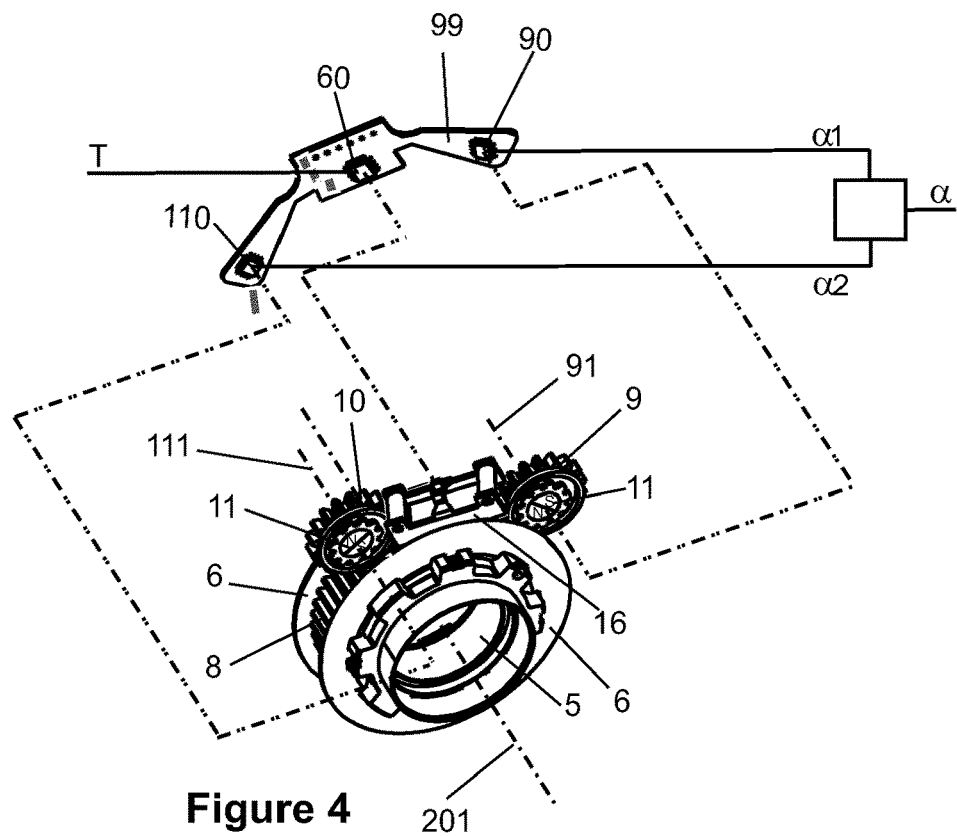
FIG. 4 is an arrangement of the gears and sensor elements and magnets of the AS and the multi-pole ring magnet and flux conductor and magnetic sensor of TS.

As shown in FIG. 4, the ring magnet 5 is surrounded circumferentially by a first gear wheel 8 having an outwardly directed first toothing, which is a part of AS 4. The first gear 8 is fixed to the lower steering shaft 2" via the flux conductor 6. The sensor unit 80 further comprises a circuit board 99 with the magnetic sensor 60. The flux conductors 6, 16 serve concentration of the magnetic flux on the magnetic sensor 60. Additionally to the magnetic sensor 60 of the TS 3 the circuit board 99 comprises two angle sensor elements 90, 110 of the AS 4, which detect the rotational angle ($\alpha 1$, $\alpha 2$) of the smaller gears 9,10, so the absolute steering angle ($\alpha$) can be obtained. The sensor elements 90, 110 are preferably Hall-sensors. In another preferred embodiment the sensor elements 90, 110 are Magneto Resistive (MR) sensors.

Two smaller gear wheels 9, 10 rotate on the toothing of the first gear 8. The gear wheels 9, 10 rotate around gear wheel axis 91, 111, wherein the gear wheel axis 91, 111 is parallel and shifted to the steering shaft axis 201. These smaller gears 9, 10 have gear ratios higher than one and they differ by one or more teeth, so that one gear wheel turns faster than the other. In each of the two small gears 9, 10 a two-pole permanent magnet 11 is arranged, providing magnetic signal for angle sensor elements 90, 110 placed very close to the multi-pole ring magnet 5 of the TS. With this called nonius principle it is possible to determine an unambiguous steering angle over for example four full turns of the steering shaft 2 or the steering wheel 50. In a preferred embodiment the steering angle range can be within +−500°, wherein the gear ratios can be changed to cover at least 1000°. The upper steering shaft 2' position can be determined according to the lower shaft position 2" and a torque signal based on the differential angle between the upper 2' and lower 2" steering shaft.

It is also possible to detect the steering angle (α) directly on the upper steering shaft 2' in order to obtain a more precise signal.

The multi-pole ring magnet 5 and the two-pole magnets 11 of the two smaller gears 9, 10 cause disturbances on each other, which especially effects the torque sensor 3, because the two two-pole magnets 11 of the smaller gears are arranged close to the torque sensor. The effect of these magnets can be detected in the TS performance because of magnetic crosstalk via air, stator and a magnetic flux collector.

Figure 5:
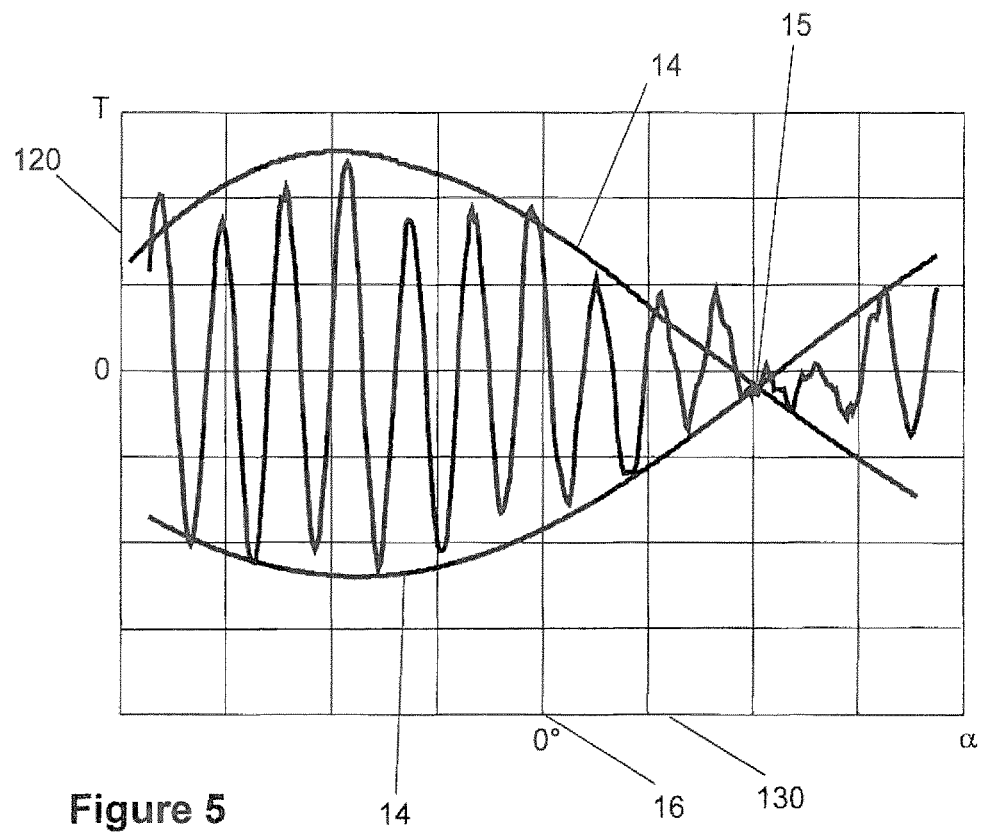
FIG. 5 is a view of a TS signal disturbance caused by AS magnets with random assembly.
Figure 6:
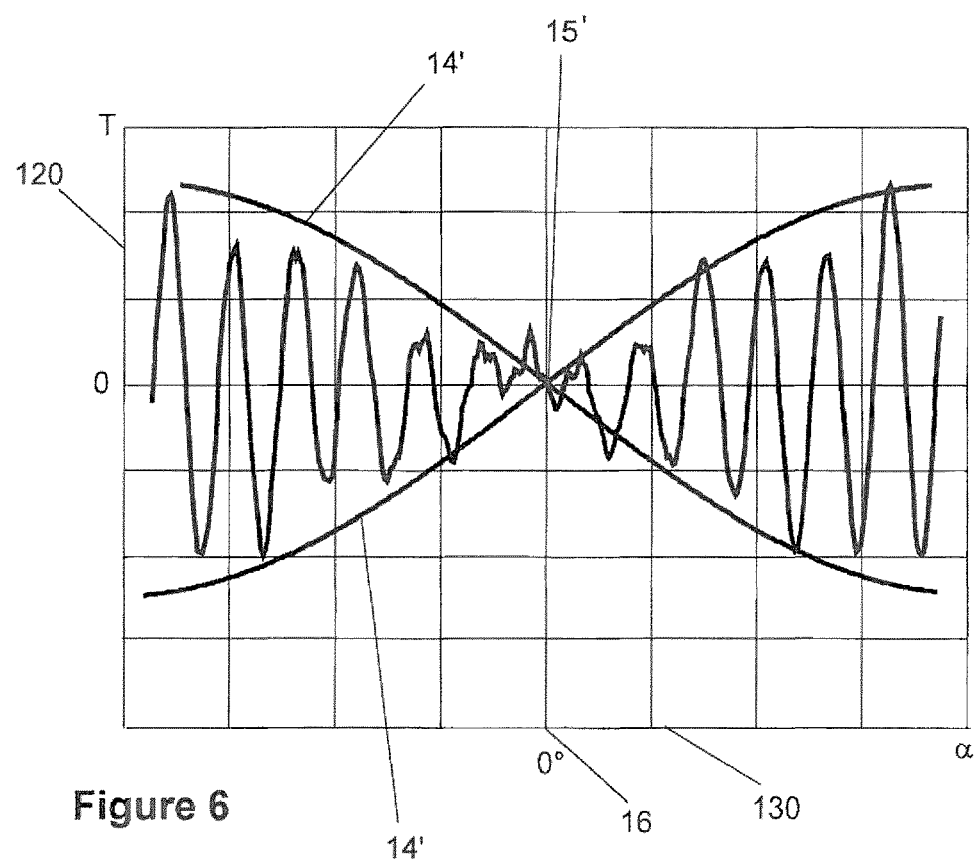
FIG. 6 is a view of a TS signal disturbance caused by AS magnets with assembly.

FIG. 5 shows the measured signal error 120 of the TS plotted against absolute steering wheel angle α 130 of the steering shaft 2, with a range of for example (+/−720°). The data is calculated using an external sensor as a reference. The envelope curve 14, 14' of the signal error of TS shows a periodic steering torque with a angle-dependency with zero crossing 15, 15' of the envelope curve 14, 14'. The magnets 11 cause a steering torque which is not initiated by the driver and which will provide an assist torque which is wrong and cause an uncomfortable steering feel (torque ripple) The magnets 11 have also disturbing effects on the MR-sensor 60. This disturbance of the magnets 11 causes an influence especially in the neutral position 16 of steering wheel 50 (this is the angle, in which the steering wheel is most of the time). Within proximity of zero crossing the TS error is minimal. Since in most of the driving cases the steering shaft angle will be at the area of nearly 0° (in neutral position 16 of steering wheel) it is highly recommended to shift the envelope curve 14 in a way to get zero crossing of the envelope curve 14' to be at neutral position (see FIG. 6) or in a range of less than a threshold value. Preferred this threshold value is +/−100°. More preferred this threshold value is +/−50°. Much more preferred this threshold value is +/−10°. This can be done by choosing proper angular position of AS magnets during assembly of the steering column.

The following procedure is carried out during Servo Unit End Of Line (EOL) calibration:
a) AS 4 is pre-assembled randomly (magnets 11 can be positioned in any direction ignoring their magnetization direction) and arranged on the on the toothing of the first gear 8 of the torque sensor 3;
b) AS 4 and and TS 3 are assembled into the steering column;
c) Torque sensor (TS) EOL calibration is carried out;
d) Steering column is rotated from one endpoint to the other in one direction (which is depending on the range of the steering shaft angle α, which can be for example ~1500°). After that steering column rotation is stopped;
e) TS signal and steering wheel angle position provided by an external position sensor are stored simultaneously to step d).
f) TS error signal is determined as a function of a steering torque depending steering shaft angle α.
g) An envelope curve 14 is fitted to the TS error signal (see FIG. 3) e.g. by external PC calculation;
h) Steering shaft angle α of zero crossing point 15 of envelope curve is determined;
i) According to step h), steering column is turned back to that given STWA of zero crossing point 15' so that the neutral position 16 of the steering wheel in relation to the zero crossing point 15' of the envelope curve 14' can be determined.

In this example the calibration for determining the zero-crossing 15' of the envelope curve 14' occurs by a final assembling of the mechanical components like the smaller gear wheels 9, 10 or the steering shaft 2 which can be rotated in the correct position until that point, that the zero crossing point is such narrow as possible to the neutral position 16 of the steering wheel 50.

In order to adjust the neutral position in relation to the zero crossing point, the steering column is finally assembled by turning the road wheels 600 into the straight run (β~0°).

The determination of the steering shaft angle and/or the torque T can be shifted software based by taking into account the influence of the envelope curve to the measured torque T and/or angle α.

It is further possible to make a torque measurement by using a torque-only sensor independently from the steering wheel position.

The steering column is assembled in a way, where the influence of the sensor magnets on steering assist at around neutral position of the steering wheel 50 is minimized, thus reducing undesired torque ripple.

The invention claimed is:

1. An electric power steering apparatus for assisting steering of a motor vehicle by conferring a support torque generated by an electric motor to a steering mechanism, the electric power steering apparatus comprising:
a steering column including an upper steering shaft,
a lower steering shaft, and
a torsion bar linking the upper steering shaft and the lower steering shaft, and
an angle sensor (AS), which comprises:
a gear with a magnet, which is configured to measure the steering shaft angle, and
a torque sensor (TS), which is configured to measure the relative shift angle between the upper steering shaft and the lower steering shaft, and wherein the TS comprises:
a multi-pole ring magnet, and
a magnetic flux conductor,
wherein the TS and AS are arranged in such a way, that the AS magnet influences the TS measurement creating a steering shaft angle depending error signal of the TS,
wherein the steering mechanism is arranged in the steering apparatus in such a way, that a zero crossing of an envelope curve of the steering shaft angle depending error signal is given for a neutral position of the steering apparatus or a range of the steering position in which the steering angle is less than a threshold angle limit.

2. The apparatus of claim 1, wherein the TS and AS are an integral unit.

3. The apparatus of claim 1, wherein the AS has two gears with magnets arranged inside, which rotate on an outwardly directed toothing of a first gear coupled torque-proof to the lower steering shaft, to measure the rate and number of lower steering shaft turns.

4. The apparatus of claim 3, wherein the AS works based on a nonius principle.

5. A method for reducing torque ripple in an electric power steering apparatus of a motor vehicle, the apparatus comprising:
a motor to support the steering operation,
a steering column with an upper steering shaft and a lower steering shaft linked by a torsion bar and
a torque sensor (TS), which is configured to measure the relative shift angle between the upper steering shaft and the lower steering shaft and
an angle sensor (AS), which comprises a gear with a magnet to measure the steering shaft angle, wherein the TS comprises a multi-pole ring magnet and a magnetic flux conductor, and wherein the TS and AS are arranged in such a way, that the at least one AS magnet influences the TS measurement creating a steering shaft angle depending error signal of the TS, wherein said method comprises the steps of:

a) preassembling the AS with pre-arrangement of the magnet;
b) arranging the AS and the TS in the steering column;
c) performing end of line calibration of the TS;
d) rotating the steering column from one endpoint to the other;
e) simultaneously with step d), measuring a TS signal (T) and a steering shaft angle with an external position sensor and storing measurement data therefrom;
f) determining a TS error signal as a function of the steering shaft angle;
g) fitting an envelope curve to the TS error signal;
h) determining the steering shaft angle at a zero crossing point of the envelop curve;
i) according to step h), turning back the steering column to a given steering shaft angle to determine a neutral position of the steering apparatus or a range of the steering position in which the steering angle is less than a threshold angle limit in relation to the zero crossing point of the envelope curve.

6. The method of claim 5, wherein the steering apparatus is adjusted by final assembling of the mechanical components in such a way that the zero crossing point is at or about the neutral position.

7. The method of claim 5, wherein the steering apparatus is fixed after turning back to the zero crossing point and assembled into the motor vehicle of which a pair of steered road wheels are oriented in a straight run position.

8. The method of claim 5, wherein the determined steering shaft angle and/or the measured TS signal (T) is calibrated software-based by the influence of the envelope curve to the measured TS signal (T) and/or angle.

9. The method according to claim 5 wherein the AS has two gears with magnets arranged inside, which rotate on an outwardly directed toothing of a first gear coupled torque-proof to the lower steering shaft, wherein the magnets provide a magnetic signal for steering angle detection.

10. The method of claim 5 wherein a steering angle of the AS is determined based on a nonius principle.

* * * * *